United States Patent
Wenren et al.

(10) Patent No.: US 10,295,793 B2
(45) Date of Patent: May 21, 2019

(54) CAMERA LENS ASSEMBLY

(71) Applicant: ZHEJIANG SUNNY OPTICS CO., LTD., Ningbo, Zhejiang (CN)

(72) Inventors: Jianke Wenren, Zhejiang (CN); Fujian Dai, Zhejiang (CN)

(73) Assignee: Zhejiang Sunny Optics Co., LTD, Ningbo, Zhejiang (CN)

( * ) Notice: Subject to any disclaimer, the term of this patent is extended or adjusted under 35 U.S.C. 154(b) by 41 days.

(21) Appl. No.: 15/511,228

(22) PCT Filed: May 5, 2016

(86) PCT No.: PCT/CN2016/081187
§ 371 (c)(1),
(2) Date: Mar. 14, 2017

(87) PCT Pub. No.: WO2017/113557
PCT Pub. Date: Jul. 6, 2017

(65) Prior Publication Data
US 2018/0143406 A1   May 24, 2018

(30) Foreign Application Priority Data

Dec. 31, 2015  (CN) .......................... 2015 1 1029991
Dec. 31, 2015  (CN) ...................... 2015 2 1139834 U

(51) Int. Cl.
*G02B 9/62* (2006.01)
*G02B 13/00* (2006.01)

(52) U.S. Cl.
CPC .......... *G02B 13/0045* (2013.01); *G02B 9/62* (2013.01)

(58) Field of Classification Search
CPC .. G02B 13/0045; G02B 9/62; G02B 27/0025; G02B 13/18; G02B 5/005; G02B 3/04;
(Continued)

(56) References Cited

U.S. PATENT DOCUMENTS

2012/0188654 A1*  7/2012  Huang ............... G02B 9/62
                                                       359/713
2013/0215520 A1   8/2013  Lai
2015/0212296 A1   7/2015  Huang et al.

FOREIGN PATENT DOCUMENTS

CN         102621667 A     8/2012
CN         202975455 U     6/2013
(Continued)

OTHER PUBLICATIONS

International search report and written opinions for PCT application CN2016081187.
(Continued)

*Primary Examiner* — Evan P Dzierzynski
*Assistant Examiner* — Sharrief I Broome
(74) *Attorney, Agent, or Firm* — Martin & Ferraro, LLP

(57) ABSTRACT

A camera lens assembly is provided, including a first lens, a second lens, a third lens, a fourth lens, a fifth lens and a sixth lens from an object side of the camera lens assembly to an image side of the camera lens assembly in turn. The first lens has a positive refractive power; the second lens has a negative refractive power, an object-side surface of the second lens is convex and an image-side surface of the second lens is concave; the third lens has a positive refractive power; the fourth lens has a refractive power, an object-side surface of the fourth lens is concave and an image-side surface of the fourth lens is convex; the fifth lens has a refractive power, an object-side surface of the fifth lens is convex and an image-side surface of the fifth lens is convex; the sixth lens has a negative refractive power.

10 Claims, 11 Drawing Sheets

(58) Field of Classification Search
CPC ...... G02B 13/002; G02B 5/208; G02B 7/021; G02B 13/001; G02B 13/0015; G02B 13/06; G02B 13/04; G02B 13/00; G02B 27/646; G02B 13/006; G02B 13/16
USPC ....... 359/713, 756, 759, 757, 738, 761, 762, 359/350, 557, 740, 763, 793; 348/355, 348/373, 294, 374, 311, 340, 360
See application file for complete search history.

(56) References Cited

FOREIGN PATENT DOCUMENTS

| | | |
|---|---|---|
| CN | 103543520 A | 1/2014 |
| CN | 203606558 U | 5/2014 |
| CN | 103869452 A | 6/2014 |
| CN | 204790153 U | 11/2015 |
| CN | 105445915 A | 3/2016 |
| CN | 205353448 U | 6/2016 |
| CN | 205374856 U | 7/2016 |
| JP | H01287616 A | 11/1989 |
| JP | 2013156579 A | 8/2013 |
| JP | 2014044372 A | 3/2014 |
| JP | 2014232147 A | 12/2014 |
| KR | 20140052907 A | 5/2014 |
| TW | 201331623 A1 | 8/2013 |

OTHER PUBLICATIONS

Office action from SIPO for CN application 201511032843.0.
Office action from SIPO for CN application 201511029991.7.
English translation of office action from SIPO for CN application 201511032843.0.
English translation of international search report for PCT application CN2016081187.
English translation of office action from SIPO for CN application 201511029991.7.

* cited by examiner

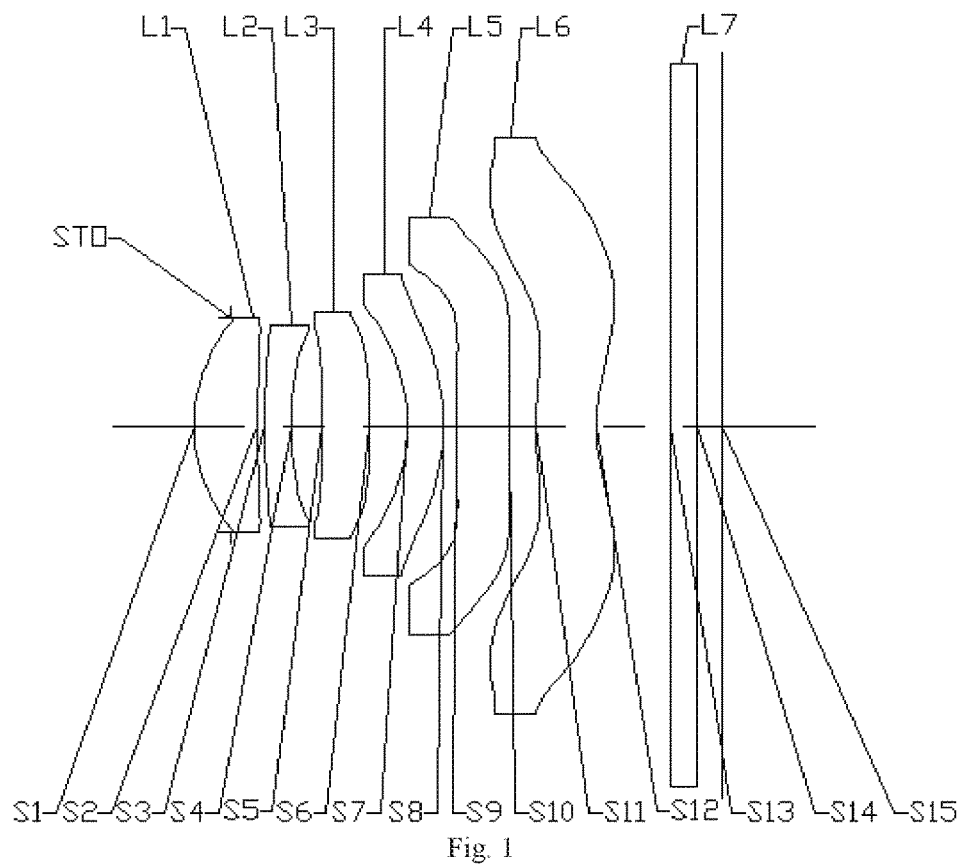
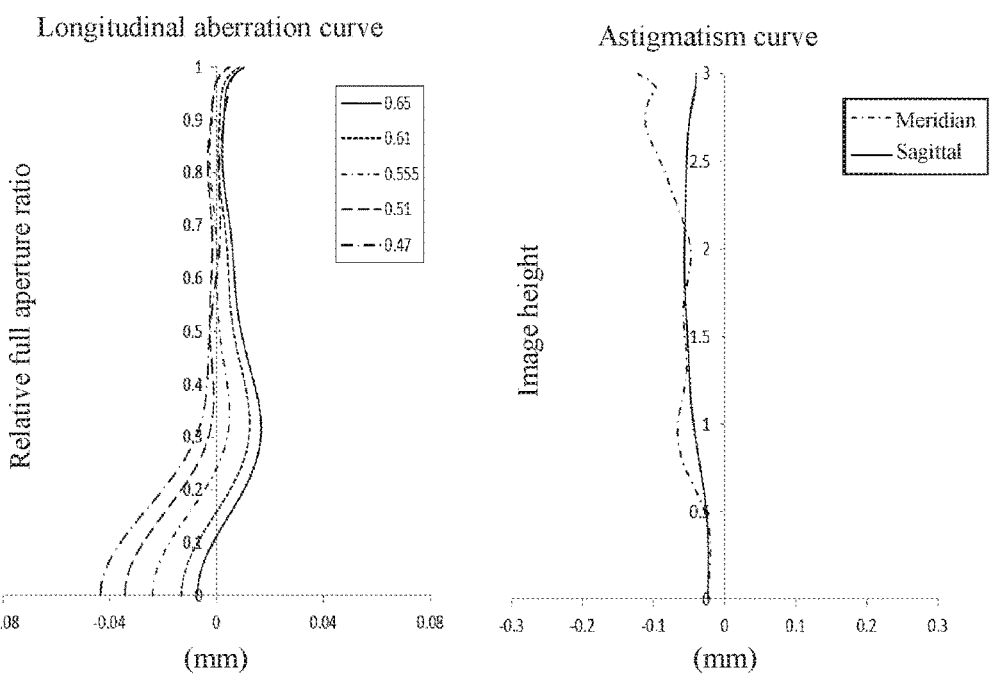
Fig. 2
Fig. 3

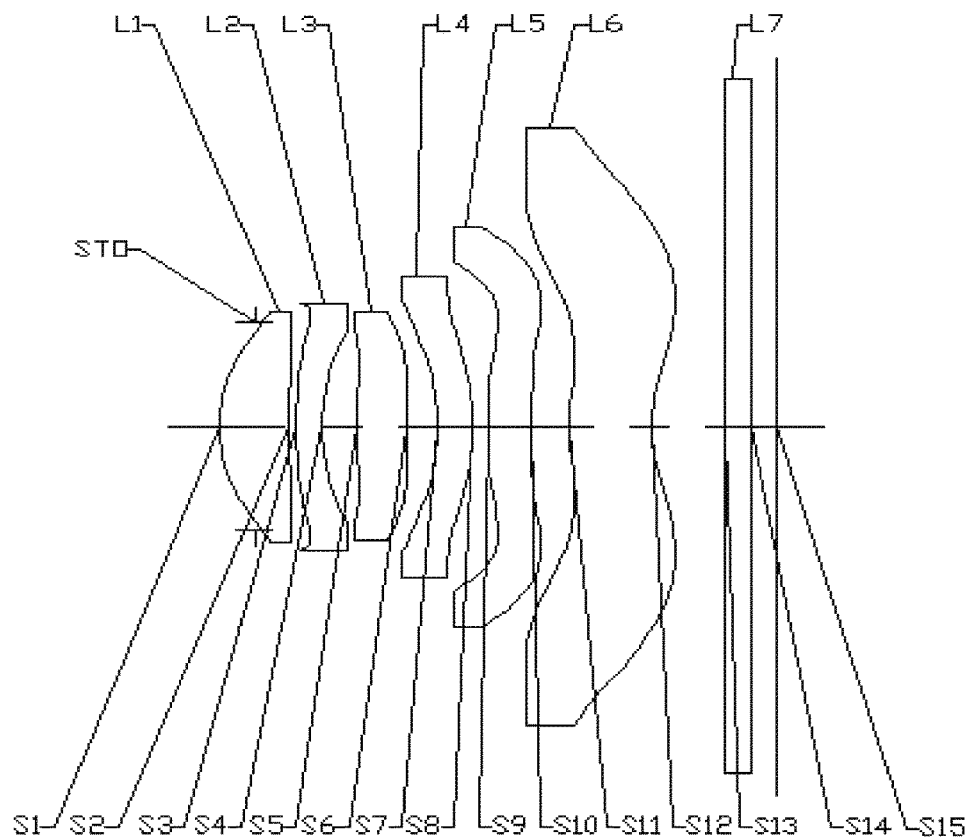
Fig. 21
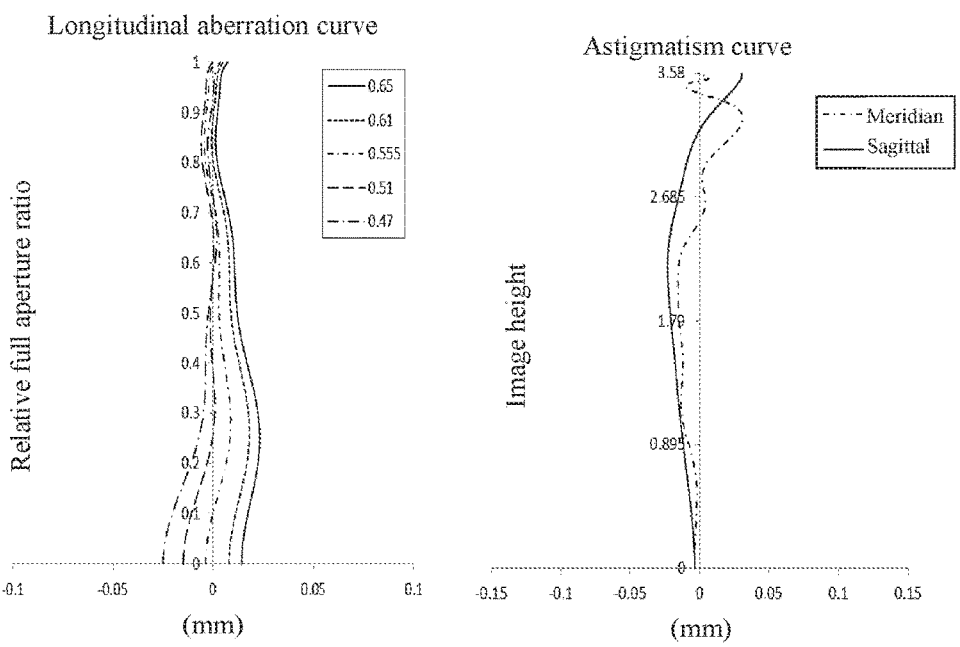
Fig. 22
Fig. 23

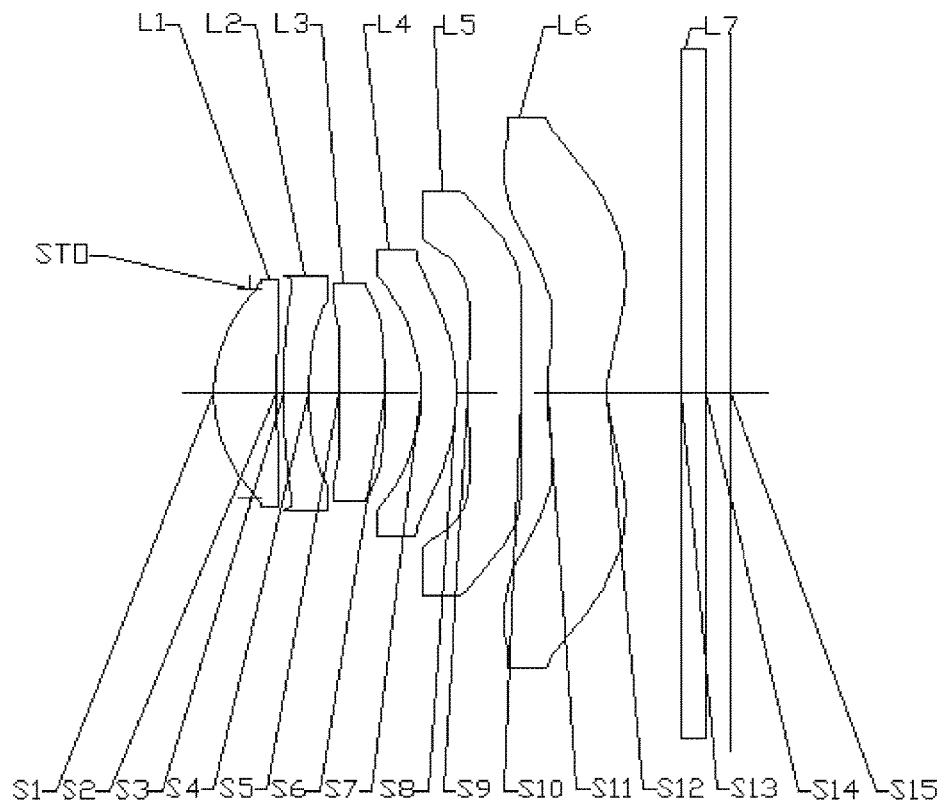
Fig. 31
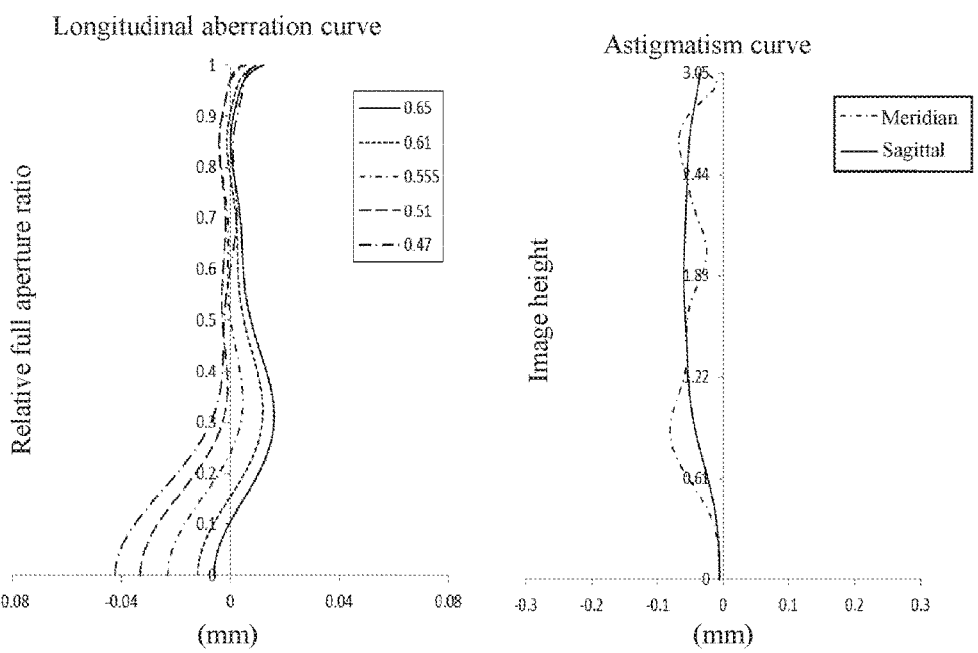
Fig. 32
Fig. 33

CAMERA LENS ASSEMBLY

CROSS REFERENCE TO RELATED APPLICATIONS

The present application is a U.S. National Phase application under 35 USC § 371 of the International Patent Application No. PCT/CN2016/081187, filed on May 5, 2016, which claims the benefit of prior Chinese Application Nos. 201511029991.7 and 201521139834.7, filed with the State Intellectual Property Office of P. R. China on Dec. 31, 2015. The entire contents of the before-mentioned patent applications are incorporated by reference as part of the disclosure of this U.S. application.

FIELD

The present disclosure relates to a field of photographing technology, in particular to a camera lens assembly.

BACKGROUND

Recently, with a development in chip technology such as CCD or CMOS, a camera lens assembly develops toward a high-pixel and miniaturization field. In order to meet such trend, a miniaturization and a high imaging performance are further required for the camera lens assembly applied to a portable electronic device.

The mainstream camera lens assembly at present generally includes five lenses, which faces difficulty in meeting a demand for analysis of higher pixel and higher quality, so it is necessary to increase the amount of lenses. However, an increase of the amount of lenses has a disadvantage on the miniaturization and lightweight of the camera lens assembly.

SUMMARY

The present disclosure seeks to solve at least one of the technical problems existing in the related art. Accordingly, embodiments of the present disclosure provide a camera lens assembly.

The camera lens assembly according to embodiments of the present disclosure includes a first lens, a second lens, a third lens, a fourth lens, a fifth lens and a sixth lens from an object side of the camera lens assembly to an image side of the camera lens assembly in turn. The first lens has a positive refractive power. The second lens has a negative refractive power, an object-side surface of the second lens is convex and an image-side surface of the second lens is concave. The third lens has a positive refractive power. The fourth lens has a refractive power, an object-side surface of the fourth lens is concave and an image-side surface of the fourth lens is convex. The fifth lens has a refractive power, an object-side surface of the fifth lens is convex and an image-side surface of the fifth lens is convex. The sixth lens has a negative refractive power. A total number of the lenses having the refractive power in the camera lens assembly is six. The camera lens assembly meets following formulas:

$|f/f3|+|f/f6|<1.0; TTL/ImgH<1.46$, in which f3 represents an effective focal length of the third lens, f6 represents an effective focal length of the sixth lens, f represents an effective focal length of the camera lens assembly, TTL represents an axial distance from an object-side surface of the first lens to an imaging plane, and ImgH equals to half of a diagonal of an effective pixel region in the imaging plane.

The camera lens assembly meeting above configurations has advantages of improving a spherical aberration and a comatic aberration, as well as increasing an imaging quality. Meanwhile, the configuration of the camera lens assembly is compact, which can reduce a volume of the camera lens assembly and shorten a total length of the camera lens assembly effectively, and thus the miniaturization of the camera lens assembly is kept.

In one embodiment, the camera lens assembly meets a following formula:

$1.0<CT3/CT4<1.6$, in which CT3 represents a central thickness of the third lens in an optical axis, and CT4 represents a central thickness of the fourth lens in the optical axis.

In one embodiment, the camera lens assembly meets a following formula:

$-2.1<f6/f<-1.5$.

In one embodiment, the camera lens assembly meets a following formula:

$f/EPD<2.1$, in which EPD represents a diameter of an entrance pupil.

In one embodiment, an image-side surface of the sixth lens is concave, and the camera lens assembly meets a following formula:

$-0.5<R12/R10<0$, in which R12 represents a curvature radius of the image-side surface of the sixth lens, and R10 represents a curvature radius of the image-side surface of the fifth lens.

In one embodiment, the camera lens assembly meets a following formula:

$0.8 ImgH/f<1.0$,

In one embodiment, the camera lens assembly meets a following formula:

$0.5<CT5/CT6<1.4$, in which CT5 represents a central thickness of the fifth lens in an optical axis, and CT6 represents a central thickness of the sixth lens in the optical axis.

In one embodiment, the camera lens assembly meets a following formula:

$-1<f12/f6<-0.5$, in which f12 represents a combined focal length of the first lens and the second lens.

In one embodiment, the camera lens assembly meets a following formula:

$0.8<DT11/DT32<1.2$, in which DT11 represents an effective radius of an object-side surface of the first lens, and DT32 represents an effective radius of an image-side surface of the third lens.

In one embodiment, the camera lens assembly meets a following formula:

$0.35<DT11/DT62<0.5$, in which DT11 represents an effective radius of an object-side surface of the first lens, and DT62 represents an effective radius of an image-side surface of the sixth lens.

Additional aspects and advantages of the present disclosure will be given in part in the following descriptions, become apparent in part from the following descriptions, or be learned from the practice of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 is a schematic view showing a camera lens assembly according to Embodiment 1 of the present disclosure;

FIG. 2 is a diagram showing a longitudinal aberration curve (mm) of the camera lens assembly in Embodiment 1;

FIG. 3 is a diagram showing an astigmatism curve (mm) of the camera lens assembly in Embodiment 1;

FIG. 21 is a schematic view showing a camera lens assembly according to Embodiment 5 of the present disclosure;

FIG. 22 is a diagram showing a longitudinal aberration curve (mm) of the camera lens assembly in Embodiment 5;

FIG. 23 is a diagram showing an astigmatism curve (mm) of the camera lens assembly in Embodiment 5;

FIG. 31 is a schematic view showing a camera lens assembly according to Embodiment 7 of the present disclosure;

FIG. 32 is a diagram showing a longitudinal aberration curve (mm) of the camera lens assembly in Embodiment 7;

FIG. 33 is a diagram showing an astigmatism curve (mm) of the camera lens assembly in Embodiment 7;

DETAILED DESCRIPTION

Figure 4:
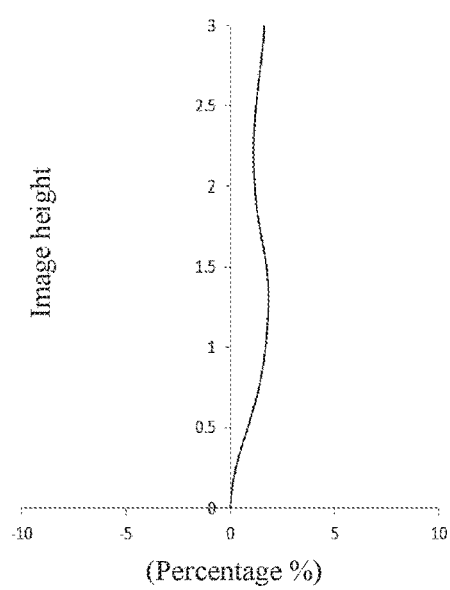
FIG. 4 is a diagram showing a distortion curve (%) of the camera lens assembly in Embodiment 1.

Embodiments of the present disclosure will be described in detail in the following descriptions, examples of which are shown in the accompanying drawings, in which the same or similar reference numerals represent the same or similar elements or elements having the same or similar functions throughout the descriptions. The embodiments described hereinafter with reference to the accompanying drawings are explanatory and illustrative, which are used to generally understand the present disclosure, but shall not be construed to limit the present disclosure.

In the specification, it is to be understood that terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, unless specified otherwise, "a plurality of" means two or more than two.

In the description of the present disclosure, it should be noted that, unless otherwise clearly defined and limited, the terms "mounted", "connected", "connection" should be broadly understood, and may be, for example, fixed connections, detachable connections, or integral connections; may also be electrical connections or may communicate with each other; may also be direct connections or indirect connections via intermediation; may also be inner communications or interaction relationship of two elements, which can be understood by those ordinary skilled in the art according to specific situations.

Various embodiments and examples are provided in the following descriptions to implement different structures of the present disclosure. In order to simplify the present disclosure, certain elements and settings will be described. However, these elements and settings are only by way of example and are not intended to limit the present disclosure. In addition, reference numerals and/or reference letters may be repeated in different examples in the present disclosure, this repeating is for the purpose of simplification and clarity and does not refer to relations between different embodiments and/or settings. Furthermore, examples of specific processes and materials are provided in the present disclosure, however, it would be appreciated by those ordinary skilled in the art that other processes and/or materials may be also applied.

Referring to FIG. 1, a camera lens assembly according to a preferred embodiment of the present disclosure is provided, including a first lens L1, a second lens L2, a third lens L3, a fourth lens L4, a fifth lens L5 and a sixth lens L6 from an object side of the camera lens assembly to an image side of the camera lens assembly in turn.

The first lens L1 has a positive refractive power. The second lens L2 has a negative refractive power, an object-side surface S3 of the second lens L2 is convex and an image-side surface S4 of the second lens L2 is concave. The third lens L3 has a positive refractive power. The fourth lens L4 has a refractive power, an object-side surface S7 of the fourth lens L4 is concave and an image-side surface S8 of the fourth lens L4 is convex. The fifth lens L5 has a refractive power, an object-side surface S9 of the fifth lens L5 is convex and an image-side surface S10 of the fifth lens L5 is convex. The sixth lens L6 has a negative refractive power. A total number of the lenses having the refractive power in the camera lens assembly is six.

The camera lens assembly meets following formulas:

$$|f/f3|+|f/f6|<1.0; TTL/ImgH<1.46,$$

in which f13 represents an effective focal length of the third lens L3, f6 represents an effective focal length of the sixth lens L6, f represents an effective focal length of the camera lens assembly, TTL represents an axial distance from an object-side surface S1 of the first lens L1 to an imaging plane S15, and ImgH equals to half of a diagonal of an effective pixel region in the imaging plane S15.

The camera lens assembly meeting above configurations has advantages of improving a spherical aberration and a comatic aberration, as well as increasing an imaging quality. Meanwhile, the configuration of the camera lens assembly is compact, which can reduce a volume of the camera lens assembly and shorten a total length of the camera lens assembly effectively, and thus the miniaturization of the camera lens assembly is kept.

Preferably, the camera lens assembly meets a following formula:

$$1.0<CT3/CT4<1.6,$$

in which CT3 represents a central thickness of the third lens L3 in an optical axis, and CT4 represents a central thickness of the fourth lens L4 in the optical axis.

The camera lens assembly meeting the above configuration contributes to reasonably setting the central thicknesses of the third lens and the fourth lens, such that it is easy to assemble the camera lens assembly and a sensitivity of the camera lens assembly is decreased.

Preferably, the camera lens assembly meets a following formula:

$$-2.1<f6/f<-1.5.$$

The camera lens assembly meeting the above configuration allows a beam angle of the camera lens assembly to be gentle and decreases a tolerance sensitivity effectively.

Preferably, the camera lens assembly meets a following formula:

$$f/EPD<2.1,$$

in which EPD represents a diameter of an entrance pupil.

The camera lens assembly meeting the above configuration contributes to obtaining a better imaging quality when photographing with the camera lens assembly in a dim illumination, as well as to blurring out a background so as to highlight a theme.

Preferably, an image-side surface S12 of the sixth lens L6 is concave, and the camera lens assembly meets a following formula:

$$-0.5<R12/R10<0,$$

in which R12 represents a curvature radius of the image-side surface S12 of the sixth lens L6, and R10 represents a curvature radius of the image-side surface S10 of the fifth lens L5.

The camera lens assembly meeting the above configuration contributes to adjusting an incident angle of each field of view coming into a photosensitive element and avoiding a total reflection effectively.

Preferably, the camera lens assembly meets a following formula:

$$0.8 ImgH/f<1.0,$$

in which ImgH equals to half of a diagonal of an effective pixel region in the imaging plane S15.

The camera lens assembly meeting the above configuration contributes to improving a filed angle of the camera lens assembly, so as to ensure the miniaturization of the camera lens assembly while providing a large filed angle.

Preferably, the camera lens assembly meets a following formula:

$$0.5<CT5/CT6<1.4,$$

in which CT5 represents a central thickness of the fifth lens L5 in the optical axis, and CT6 represents a central thickness of the sixth lens L6 in the optical axis.

The camera lens assembly meeting the above configuration contributes to reasonably setting the central thicknesses of the fifth lens L5 and the sixth lens L6, thus further ensuring the miniaturization of the camera lens assembly.

Preferably, the camera lens assembly meets a following formula:

$$-1<f12/f6<-0.5,$$

in which f12 represents a combined focal length of the first lens L1 and the second lens L2.

The camera lens assembly meeting the above configuration contributes to reasonably allocating a focal power of system, effectively correcting the spherical aberration of system, and increasing the imaging quality further.

Preferably, the camera lens assembly meets a following formula:

$$0.8<DT11/DT32<1.2,$$

in which DT11 represents an effective radius of the object-side surface S1 of the first lens L1, and DT32 represents an effective radius of an image-side surface S6 of the third lens L3.

The camera lens assembly meeting the above configuration contributes to setting a size of a front end of the camera lens assembly, so as to effectively control the size of the front end of the camera lens assembly.

Preferably, the camera lens assembly meets a following formula:

0.35<DT11/DT62<0.5, in which DT11 represents the effective radius of the object-side surface S1 of the first lens L1, and DT62 represents an effective radius of the image-side surface S12 of the sixth lens L6.

The camera lens assembly meeting the above configuration contributes to setting a field angle of a rear end of the camera lens assembly, such that more of lights entering through the camera lens assembly may be imaged in the imaging plane S15.

During imaging, the light sequentially passes through the six lenses and a light filter L7 having an object-side surface S13 and an image-side surface S14, and then is imaged in the imaging plane S15.

In some embodiments, the first lens L1, the second lens L2, the third lens L3, the fourth lens L4, the fifth lens L5 and the sixth lens L6 may all be aspheric lenses.

A surface shape of an aspheric surface is defined by a formula as below:

$$x = \frac{ch^2}{1 + \sqrt{1-(k+1)c^2h^2}} + \sum A_i h^i$$

in which h represents a height from any point on the aspheric surface to the optical axis, c represents a vertex curvature, k represents a conic coefficient, Ai represents an i-th order aspheric correction coefficient.

Embodiment 1

Figure 5:
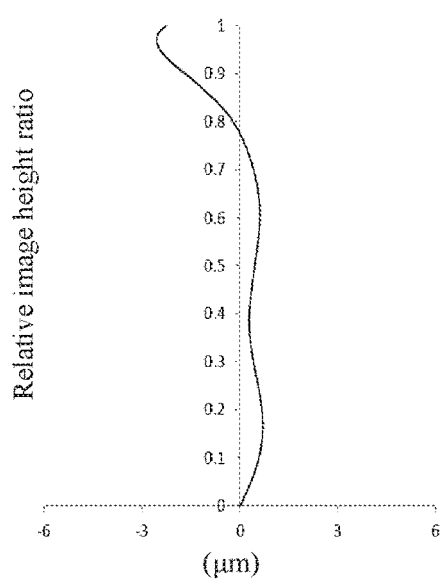
FIG. 5 is a diagram showing a lateral color curve (μm) of the camera lens assembly in Embodiment 1.

With reference to FIG. 1 to FIG. 5, in embodiment 1, the camera lens assembly meets conditions in following tables 1, 2 and 3.

TABLE 1

| Surface No. | Surface type | Curvature radius | Thickness | Refractive index/abbe number | Conic coefficient |
|---|---|---|---|---|---|
| OBJ | spherical | infinity | infinity | — | — |
| STO | spherical | infinity | −0.2920 | — | — |
| S1 | aspheric | 1.3021 | 0.5115 | 1.544/56.11 | −0.8486 |
| S2 | aspheric | 4.4009 | 0.0614 | — | 0.3178 |
| S3 | aspheric | 3.2359 | 0.2106 | 1.651/21.52 | −0.3361 |
| S4 | aspheric | 2.0787 | 0.2473 | — | 0.2989 |
| S5 | aspheric | 14.5996 | 0.3964 | 1.535/55.80 | −0.9990 |

TABLE 1-continued

| Surface No. | Surface type | Curvature radius | Thickness | Refractive index/abbe number | Conic coefficient |
|---|---|---|---|---|---|
| S6 | aspheric | −7.8561 | 0.2996 | — | −1.0001 |
| S7 | spherical | −1.5506 | 0.3000 | 1.651/21.52 | — |
| S8 | aspheric | −1.6130 | 0.1000 | — | −1.6410 |
| S9 | aspheric | 7193.0239 | 0.4356 | 1.535/55.80 | 14.5392 |
| S10 | aspheric | −18748.3936 | 0.2159 | — | 0.2986 |
| S11 | aspheric | 2.2799 | 0.4840 | 1.535/55.80 | −0.8548 |
| S12 | aspheric | 1.2688 | 0.6112 | — | −1.0017 |
| S13 | spherical | infinity | 0.2100 | 1.517/64.17 | — |
| S14 | spherical | infinity | 0.1965 | — | — |
| S15 | spherical | infinity | — | — | — |

TABLE 2

High order aspheric coefficients A4, A6, A8, A10, A12, A14, A16 of the aspheric lens are shown in the following table.

| Surface No. | A4 | A6 | A8 | A10 | A12 | A14 | A16 |
|---|---|---|---|---|---|---|---|
| S1 | 3.4250E−02 | 1.4834E−01 | −5.6016E−01 | 1.5486E+00 | −2.5668E+00 | 2.3559E+00 | −9.5992E−01 |
| S2 | −3.3186E−01 | 6.4105E−01 | −2.0640E−01 | −1.5052E+00 | 2.8125E+00 | −2.1104E+00 | 5.3960E−01 |
| S3 | −5.8754E−01 | 1.7729E+00 | −3.8744E+00 | 7.8446E+00 | −1.2598E+01 | 1.2144E+01 | −4.9054E+00 |
| S4 | −3.2201E−01 | 1.0568E+00 | −2.1018E+00 | 3.7494E+00 | −4.2912E+00 | 1.4953E+00 | 1.4870E+00 |
| S5 | −1.0188E−01 | −8.4824E−01 | 5.3322E+00 | −1.9819E+01 | 4.2230E+01 | −4.9349E+01 | 2.4620E+01 |
| S6 | −1.3336E−01 | −8.6812E−02 | 5.2971E−01 | −2.5723E+00 | 5.6198E+00 | −6.1597E+00 | 2.7787E+00 |
| S8 | 1.4710E−01 | −7.0125E−01 | 1.4961E+00 | −1.8699E+00 | 1.4794E+00 | −6.5771E−01 | 1.2194E−01 |
| S9 | 3.2880E−01 | −1.1231E+00 | 1.7141E+00 | −1.7047E+00 | 1.0405E+00 | −3.7234E−01 | 6.0816E−02 |
| S10 | 1.3456E−01 | −3.5961E−01 | 3.3318E−01 | −1.8108E−01 | 5.1068E−02 | −5.4825E−03 | −4.1879E−05 |
| S11 | −3.7787E−01 | 1.0708E−01 | 1.7796E−02 | −1.6122E−02 | 3.6729E−03 | −3.7327E−04 | 1.4376E−05 |
| S12 | −4.0662E−01 | 2.4987E−01 | −1.2331E−01 | 4.1448E−02 | −8.5508E−03 | 9.6034E−04 | −4.4453E−05 |

TABLE 3

| f1 (mm) | 3.2 | f (mm) | 3.64 |
|---|---|---|---|
| f2 (mm) | −9.54 | Fno | 2.09 |
| f3 (mm) | 9.57 | TTL (mm) | 4.28 |
| f4 (mm) | 67.52 | | |
| f5 (mm) | 9684.9 | | |
| f6 (mm) | −6.4 | | |

Embodiment 2

Figure 6:
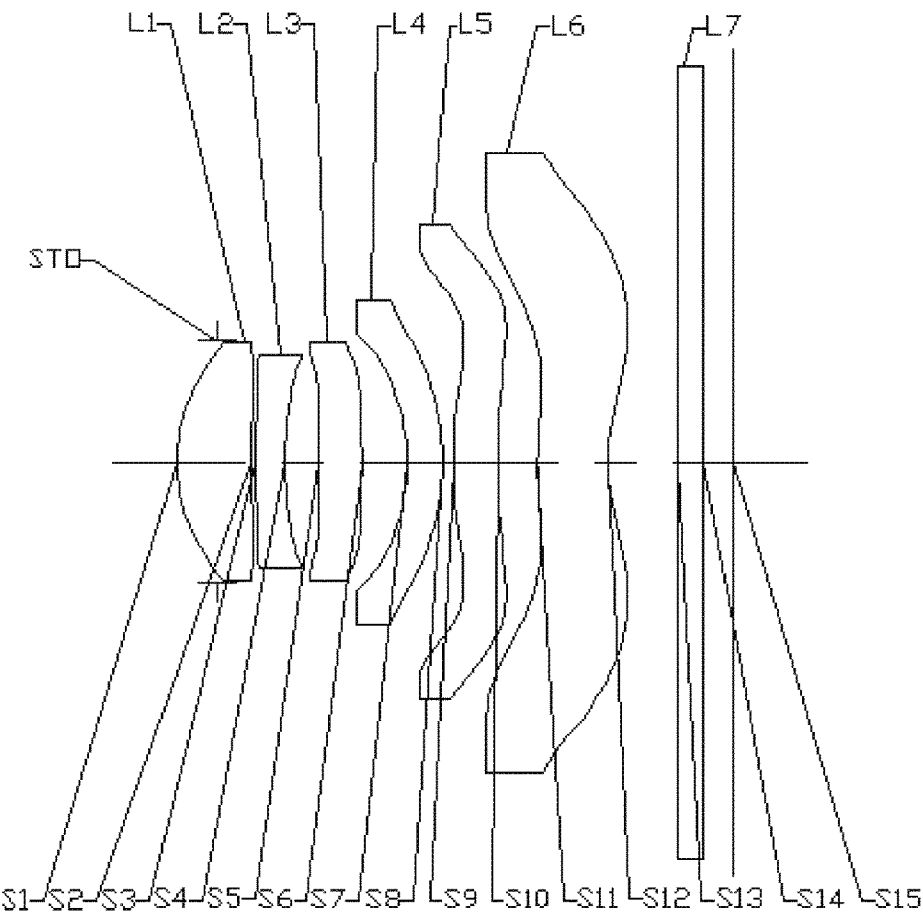
FIG. 6 is a schematic view showing a camera lens assembly according to Embodiment 2 of the present disclosure.
Figure 7:
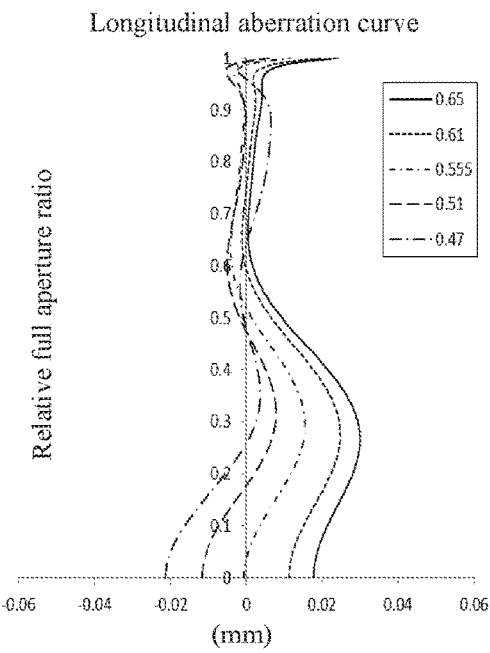
FIG. 7 is a diagram showing a longitudinal aberration curve of the camera lens assembly in Embodiment 2.
Figure 8:
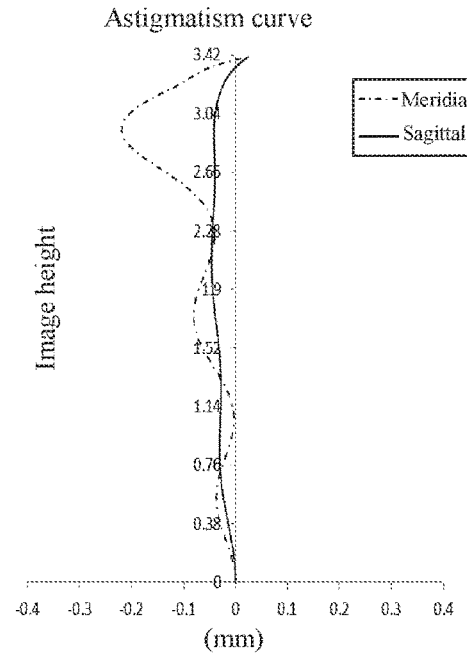
FIG. 8 is a diagram showing an astigmatism curve (mm) of the camera lens assembly in Embodiment 2.
Figure 9:
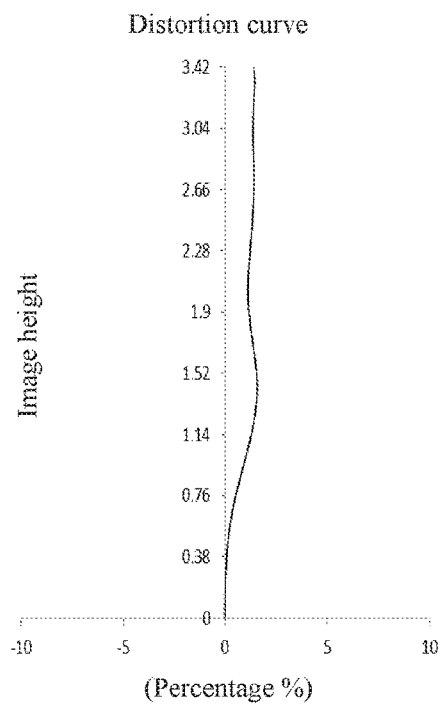
FIG. 9 is a diagram showing a distortion curve (%) of the camera lens assembly in Embodiment 2.
Figure 10:
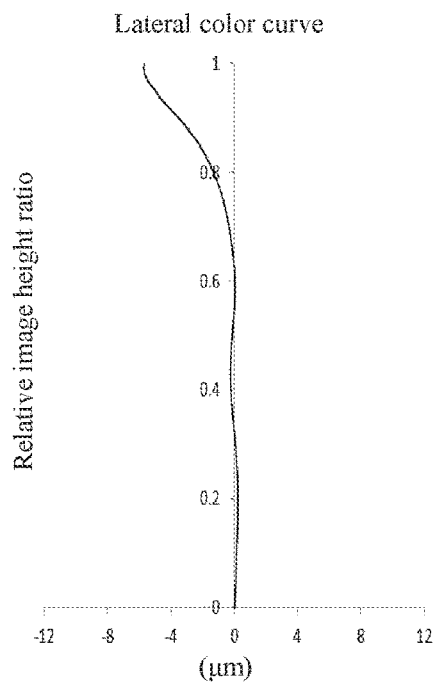
FIG. 10 is a diagram showing a lateral color curve (μm) of the camera lens assembly in Embodiment 2.

With reference to FIG. 6 to FIG. 10, in embodiment 2, the camera lens assembly meets conditions in following tables 4, 5 and 6.

TABLE 4

| Surface No. | Surface type | Curvature radius | Thickness | Refractive index/abbe number | Conic coefficient |
|---|---|---|---|---|---|
| OBJ | spherical | infinity | infinity | — | — |
| STO | spherical | infinity | −0.3353 | — | — |
| S1 | aspheric | 1.4123 | 0.6105 | 1.544/56.11 | −0.8997 |
| S2 | aspheric | 3.9920 | 0.0440 | — | −7.7479 |
| S3 | aspheric | 5.0949 | 0.2481 | 1.651/21.52 | −1.1097 |
| S4 | aspheric | 3.2053 | 0.2818 | — | 2.6346 |
| S5 | aspheric | 10.2559 | 0.3565 | 1.544/56.11 | 4.1708 |
| S6 | aspheric | −28.3342 | 0.3757 | — | −96.4572 |
| S7 | aspheric | −1.8156 | 0.3000 | 1.651/21.52 | 0.3611 |
| S8 | aspheric | −2.1878 | 0.0826 | — | 0.5552 |
| S9 | aspheric | 6.8993 | 0.3764 | 1.535/55.80 | 13.5223 |
| S10 | aspheric | −11430.5083 | 0.3253 | — | −99.0000 |
| S11 | aspheric | 3.1864 | 0.5881 | 1.535/55.80 | −0.8281 |
| S12 | aspheric | 1.5123 | 0.5848 | — | −0.9816 |
| S13 | spherical | infinity | 0.2100 | 1.517/64.17 | — |
| S14 | spherical | infinity | 0.2462 | — | — |
| S15 | spherical | infinity | — | — | — |

TABLE 5

High order aspheric coefficients A4, A6, A8, A10, A12, A14, A16 of the aspheric lens are shown in the following table.

| Surface No. | A4 | A6 | A8 | A10 | A12 | A14 | A16 |
|---|---|---|---|---|---|---|---|
| S1 | 4.2203E−02 | 1.0848E−04 | 4.8889E−02 | −1.0945E−01 | 9.9647E−02 | −2.3302E−02 | −3.1225E−02 |
| S2 | −2.4964E−01 | −8.6055E−02 | 1.7946E+00 | −4.2562E+00 | 4.8449E+00 | −2.8840E+00 | 7.1662E−01 |
| S3 | −3.8075E−01 | 4.4123E−01 | 8.2156E−01 | −2.9723E+00 | 3.8263E+00 | −2.3886E+00 | 6.2284E−01 |
| S4 | −1.8659E−01 | 3.9275E−01 | 3.2835E−01 | −2.8724E+00 | 6.4343E+00 | −6.7982E+00 | 2.9717E+00 |
| S5 | −1.4686E−01 | −2.1070E−01 | 1.2471E+00 | −4.4210E+00 | 8.4831E+00 | −8.6723E+00 | 3.7349E+00 |
| S6 | −6.2702E−02 | −4.0870E−01 | 1.9945E+00 | −5.6007E+00 | 8.4769E+00 | −6.6680E+00 | 2.1619E+00 |
| S7 | −1.1001E−01 | 2.4252E−01 | 5.9004E−01 | −3.2210E+00 | 5.2563E+00 | −3.9106E+00 | 1.1153E+00 |
| S8 | −1.5563E−01 | 6.3162E−01 | −1.2998E+00 | 1.5124E+00 | −9.8906E−01 | 3.4243E−01 | −4.8707E−02 |
| S9 | 1.7902E−01 | −2.7953E−01 | 1.2563E−01 | −6.3353E−03 | −2.1564E−02 | 9.0280E−03 | −1.1164E−03 |
| S10 | 2.4497E−01 | −3.1694E−01 | 1.9375E−01 | −7.6974E−02 | 1.8787E−02 | −2.4763E−03 | 1.3404E−04 |
| S11 | −1.9862E−01 | 2.8221E−02 | 1.2248E−02 | −5.0222E−03 | 7.5309E−04 | −5.0903E−05 | 1.1673E−06 |
| S12 | −2.5658E−01 | 1.2613E−01 | −5.4701E−02 | 1.6175E−02 | −2.8603E−03 | 2.6935E−04 | −1.0308E−05 |

TABLE 6

| f1 (mm) | 3.69 | f (mm) | 4.01 |
|---|---|---|---|
| f2 (mm) | −13.89 | Fno | 2.06 |
| f3 (mm) | 13.84 | TTL (mm) | 4.63 |
| f4 (mm) | −23.89 | | |
| f5 (mm) | 12.85 | | |
| f6 (mm) | −6.11 | | |

Embodiment 3

Figure 11:
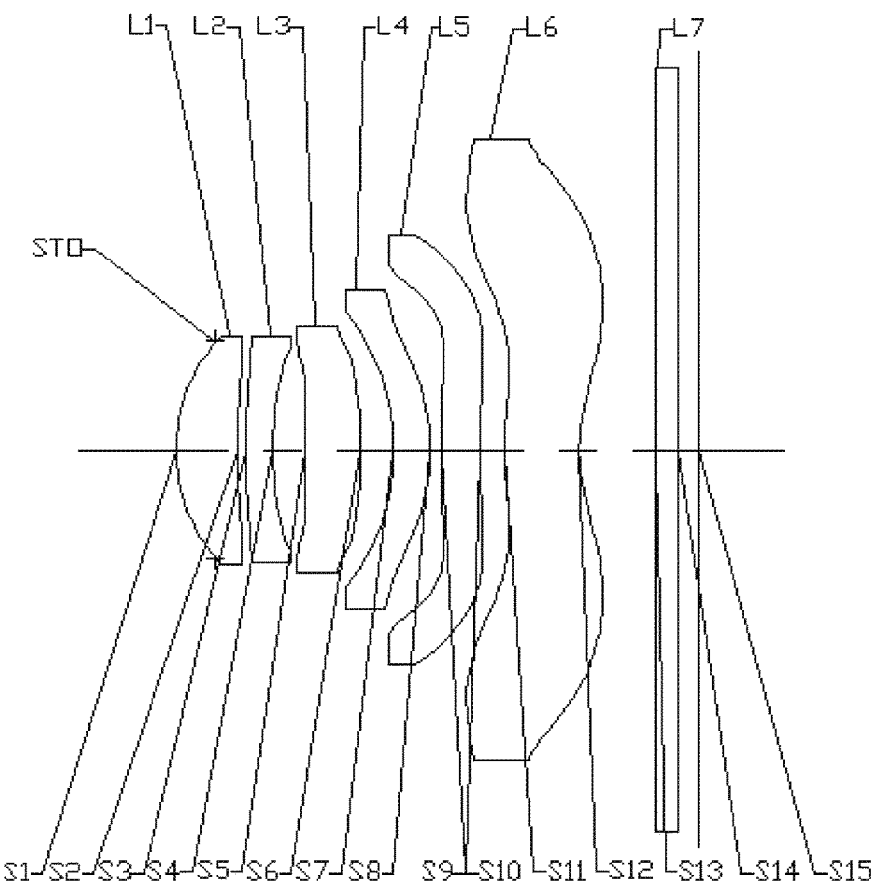
FIG. 11 is a schematic view showing a camera lens assembly according to Embodiment 3 of the present disclosure.
Figure 12:
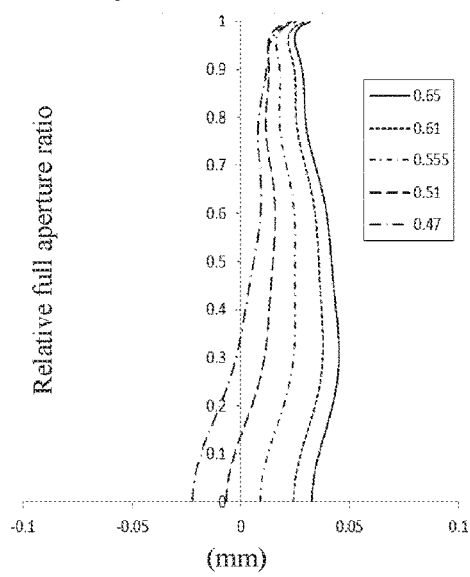
FIG. 12 is a diagram showing a longitudinal aberration curve (mm) of the camera lens assembly in Embodiment 3.
Figure 13:
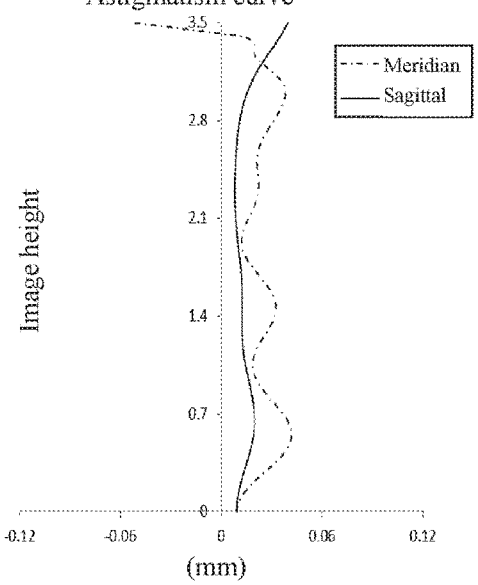
FIG. 13 is a diagram showing an astigmatism curve (mm) the camera lens assembly in Embodiment 3.
Figure 14:
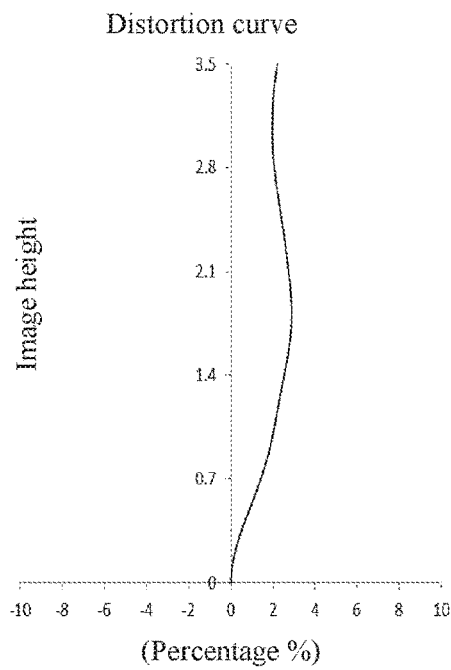
FIG. 14 is a diagram showing a distortion curve (%) of the camera lens assembly in Embodiment 3.
Figure 15:
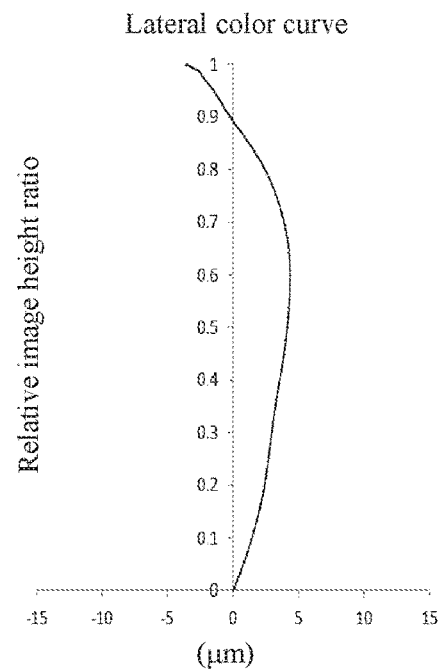
FIG. 15 is a diagram showing a lateral color curve (μm) of the camera lens assembly in Embodiment 3.

With reference to FIG. 11 to FIG. 15, in embodiment 3, the camera lens assembly meets conditions in following tables 7, 8 and 9.

TABLE 7

| Surface No. | Surface type | Curvature radius | Thickness | Refractive index/abbe number | Conic coefficient |
|---|---|---|---|---|---|
| OBJ | spherical | infinity | infinity | — | — |
| STO | spherical | infinity | −0.3400 | — | — |
| S1 | aspheric | 1.4931 | 0.5409 | 1.544/56.11 | −0.7451 |

TABLE 7-continued

| Surface No. | Surface type | Curvature radius | Thickness | Refractive index/abbe number | Conic coefficient |
|---|---|---|---|---|---|
| S2 | aspheric | 4.0324 | 0.0670 | — | −2.1710 |
| S3 | aspheric | 3.7077 | 0.2450 | 1.651/21.52 | −2.3129 |
| S4 | aspheric | 2.8470 | 0.2879 | — | 1.8927 |
| S5 | aspheric | infinity | 0.4779 | 1.535/55.80 | −0.9990 |
| S6 | aspheric | −6.7810 | 0.2975 | — | −0.9885 |
| S7 | spherical | −1.9635 | 0.3194 | 1.651/21.52 | — |
| S8 | aspheric | −1.8160 | 0.1028 | — | −1.6148 |
| S9 | aspheric | 95.3981 | 0.3423 | 1.535/55.80 | 14.5392 |
| S10 | aspheric | −100000.0000 | 0.2156 | — | 0.2986 |
| S11 | aspheric | 2.7131 | 0.6552 | 1.535/55.80 | −0.7880 |
| S12 | aspheric | 1.4422 | 0.6666 | — | −1.0118 |
| S13 | spherical | infinity | 0.2100 | 1.517/64.17 | — |
| S14 | spherical | infinity | 0.1814 | — | — |
| S15 | spherical | infinity | — | — | — |

TABLE 8

High order aspheric coefficients A4, A6, A8, A10, A12, A14, A16 of the aspheric lens are shown in the following table.

| Surface No. | A4 | A6 | A8 | A10 | A12 | A14 | A16 |
|---|---|---|---|---|---|---|---|
| S1 | 2.2951E−02 | 8.2855E−02 | −3.1270E−01 | 8.1101E−01 | −1.1560E+00 | 8.6841E−01 | −2.7210E−01 |
| S2 | −1.7347E−01 | 1.0049E−01 | 5.1497E−01 | −1.7521E+00 | 2.6765E+00 | −2.1128E+00 | 6.6494E−01 |
| S3 | −2.3676E−01 | 1.2513E−01 | 7.7977E−01 | −2.3042E+00 | 3.2030E+00 | −2.3792E+00 | 7.4085E−01 |
| S4 | −1.0586E−01 | 5.7835E−02 | 4.9044E−01 | −1.3094E+00 | 1.8403E+00 | −1.4925E+00 | 6.0254E−01 |
| S5 | −9.8775E−02 | 5.6216E−02 | −4.5563E−01 | 1.2364E+00 | −1.7122E+00 | 1.0143E+00 | −8.6461E−02 |
| S6 | −5.9767E−02 | −1.3632E−01 | 4.4899E−01 | −1.1229E+00 | 1.5151E+00 | −1.0731E+00 | 3.2692E−01 |
| S8 | 5.3088E−02 | −2.3106E−01 | 3.3497E−01 | −2.2482E−01 | 9.0808E−02 | −2.2691E−02 | 2.6098E−03 |
| S9 | 2.7603E−01 | −6.3657E−01 | 6.4361E−01 | −3.9948E−01 | 1.4616E−01 | −3.0054E−02 | 2.8176E−03 |
| S10 | 2.1840E−01 | −3.9561E−01 | 3.0791E−01 | −1.4279E−01 | 3.7962E−02 | −5.2041E−03 | 2.7761E−04 |
| S11 | −2.1583E−01 | 4.0407E−02 | 9.8793E−03 | −5.3537E−03 | 9.3253E−04 | −7.5451E−05 | 2.3862E−06 |
| S12 | −2.4248E−01 | 1.1106E−01 | −3.9094E−02 | 9.1750E−03 | −1.3307E−03 | 1.0623E−04 | −3.5197E−06 |

TABLE 9

| f1 (mm) | 4.04 | f (mm) | 3.75 |
|---|---|---|---|
| f2 (mm) | −21.06 | Fno | 1.96 |
| f3 (mm) | 12.63 | TTL (mm) | 4.61 |
| f4 (mm) | 19.82 | | |
| f5 (mm) | 177.56 | | |
| f6 (mm) | −7.0 | | |

TABLE 12

| f1 (mm) | 4.10 | f (mm) | 3.76 |
|---|---|---|---|
| f2 (mm) | −22.33 | Fno | 1.96 |
| f3 (mm) | 12.29 | TTL (mm) | 4.61 |
| f4 (mm) | 31.64 | | |
| f5 (mm) | 149.23 | | |
| f6 (mm) | −7.87 | | |

Embodiment 4

Figure 16:
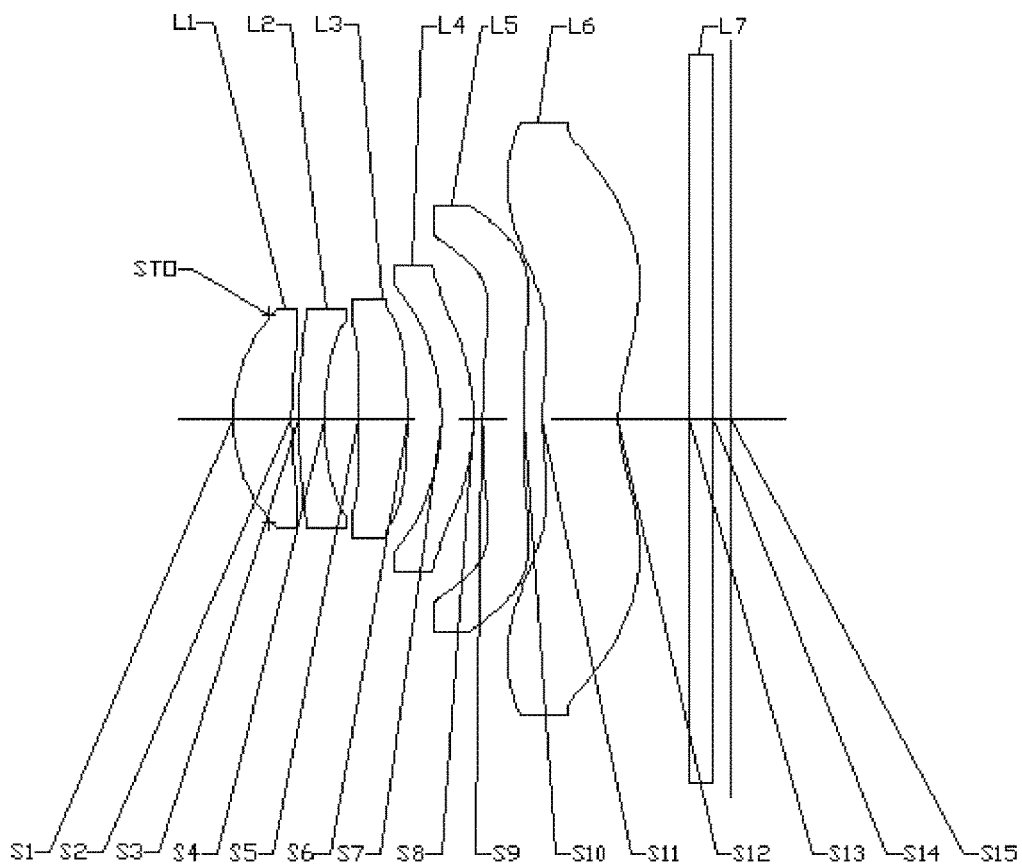
FIG. 16 is a schematic view showing a camera lens assembly according to Embodiment 4 of the present disclosure.
Figure 17:
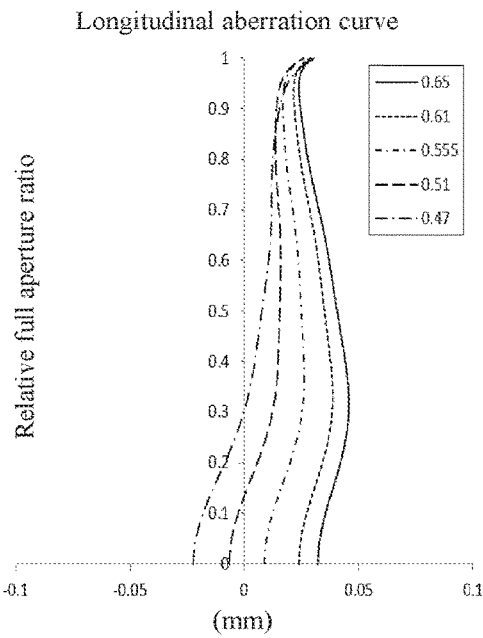
FIG. 17 is a diagram showing a longitudinal aberration curve (mm) of the camera lens assembly in Embodiment 4.
Figure 18:
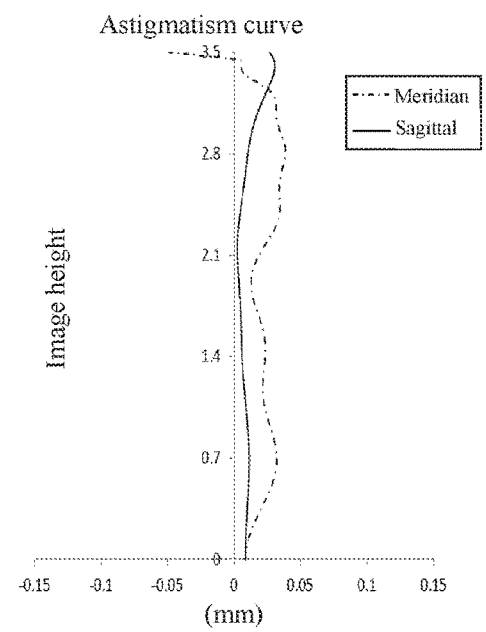
FIG. 18 is a diagram showing an astigmatism curve (mm) of the camera lens assembly in Embodiment 4.
Figure 19:
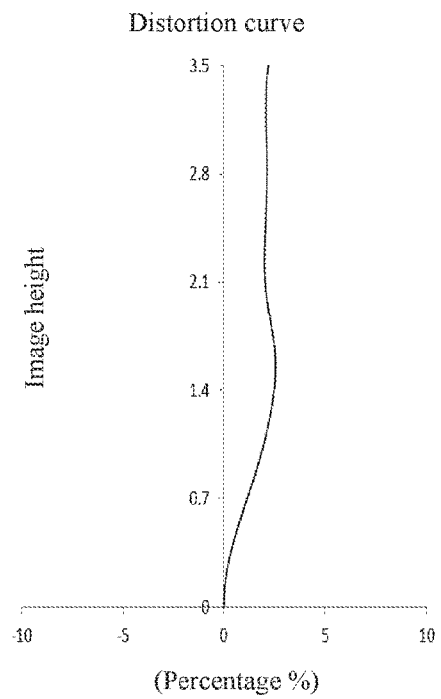
FIG. 19 is a diagram showing a distortion curve (%) of the camera lens assembly in Embodiment 4.
Figure 20:
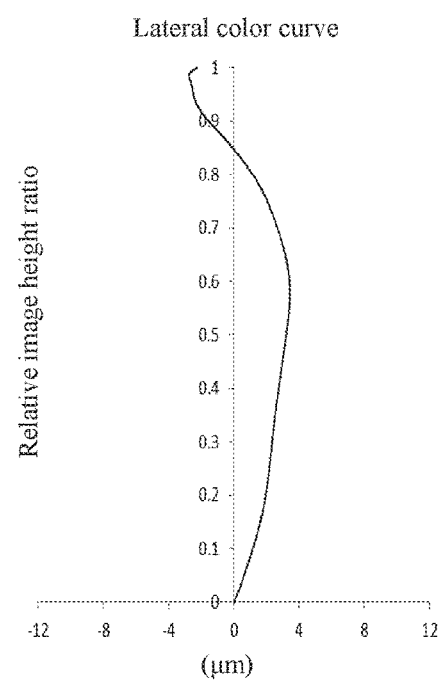
FIG. 20 is a diagram showing a lateral color curve (μm) of the camera lens assembly in Embodiment 4.

With reference to FIG. 16 to FIG. 20, in embodiment 4, the camera lens assembly meets conditions in following tables 10, 11 and 12.

TABLE 10

| Surface No. | Surface type | Curvature radius | Thickness | Refractive index/abbe number | Conic coefficient |
|---|---|---|---|---|---|
| OBJ | spherical | infinity | infinity | — | — |
| STO | spherical | infinity | −0.3400 | — | — |
| S1 | aspheric | 1.4822 | 0.5447 | 1.544/56.11 | −0.7680 |
| S2 | aspheric | 3.8180 | 0.0589 | — | −3.1407 |
| S3 | aspheric | 3.1806 | 0.2450 | 1.651/21.52 | −1.8125 |
| S4 | aspheric | 2.5337 | 0.3205 | — | 2.6849 |
| S5 | aspheric | infinity | 0.4479 | 1.535/55.80 | −0.9990 |
| S6 | aspheric | −6.5948 | 0.3125 | — | −0.9885 |
| S7 | spherical | −2.0045 | 0.3000 | 1.651/21.52 | — |
| S8 | aspheric | −1.9365 | 0.0843 | — | −1.5763 |
| S9 | aspheric | 80.1659 | 0.3714 | 1.535/55.80 | 14.5392 |
| S10 | aspheric | −100000.0000 | 0.1764 | — | 0.2986 |
| S11 | aspheric | 2.6295 | 0.7031 | 1.535/55.80 | −0.7574 |
| S12 | aspheric | 1.4691 | 0.6599 | — | −1.0042 |
| S13 | spherical | infinity | 0.2100 | 1.517/64.17 | — |
| S14 | spherical | infinity | 0.1748 | — | — |
| S15 | spherical | infinity | — | — | — |

Embodiment 5

Figures 24, 25:
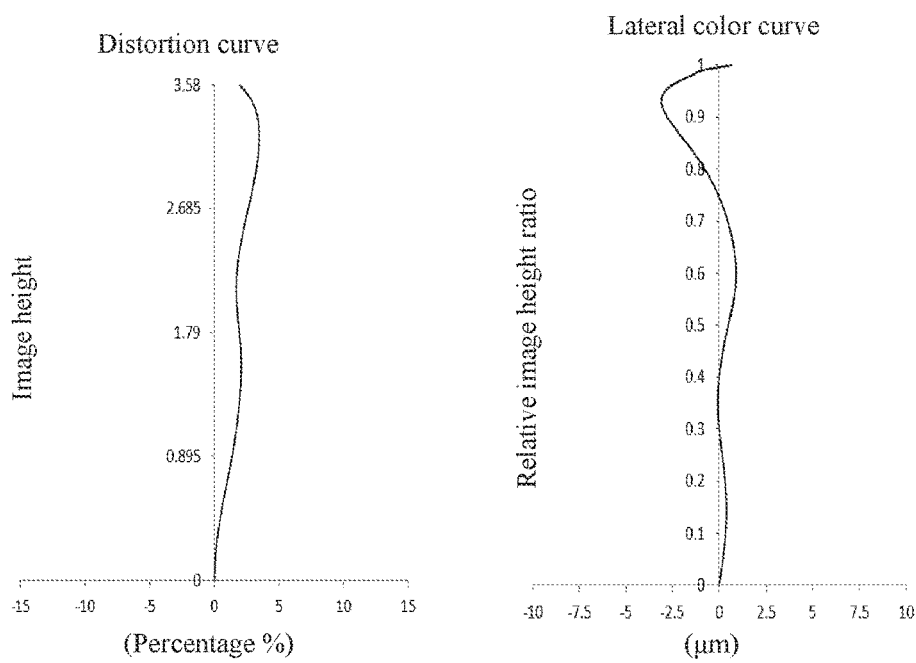
FIG. 24 is a diagram showing a distortion curve (%) of the camera lens assembly in Embodiment 5.
FIG. 25 is a diagram showing a lateralcolor curve (μm) of the camera lens assembly in Embodiment 5.

With reference to FIG. 21 to FIG. 25, in embodiment 5, the camera lens assembly meets conditions in following tables 13, 14 and 15.

TABLE 13

| Surface No. | Surface type | Curvature radius | Thickness | Refractive index/abbe number | Conic coefficient |
|---|---|---|---|---|---|
| OBJ | spherical | infinity | infinity | — | — |
| STO | spherical | infinity | −0.2920 | — | — |
| S1 | aspheric | 1.5527 | 0.5756 | 1.544/56.11 | −1.0062 |
| S2 | aspheric | 4.5314 | 0.0668 | — | −3.3353 |
| S3 | aspheric | 2.9058 | 0.2250 | 1.651/21.52 | −0.4395 |
| S4 | aspheric | 2.1234 | 0.2999 | — | 0.4524 |
| S5 | aspheric | 8.5458 | 0.4224 | 1.535/55.80 | −0.9990 |
| S6 | aspheric | −17.5072 | 0.2491 | — | −1.0001 |
| S7 | aspheric | −2.5126 | 0.3000 | 1.651/21.52 | −1.3193 |
| S8 | aspheric | −2.9530 | 0.1352 | — | −1.6211 |
| S9 | aspheric | 12.0546 | 0.3758 | 1.535/55.80 | 14.5392 |
| S10 | aspheric | −589.4029 | 0.3106 | — | 0.2986 |
| S11 | aspheric | 2.4460 | 0.6983 | 1.535/55.80 | −0.9205 |
| S12 | aspheric | 1.4092 | 0.6254 | — | −1.0267 |
| S13 | spherical | infinity | 0.2100 | 1.517/64.17 | — |
| S14 | spherical | infinity | 0.2358 | — | — |
| S15 | spherical | infinity | — | — | — |

TABLE 11

High order aspheric coefficients A4, A6, A8, A10, A12, A14, A16 of the aspheric lens are shown in the following table.

| Surface No. | A4 | A6 | A8 | A10 | A12 | A14 | A16 |
|---|---|---|---|---|---|---|---|
| S1 | 2.4042E−02 | 8.1348E−02 | −2.8834E−01 | 7.0350E−01 | −9.6476E−01 | 7.0663E−01 | −2.2000E−01 |
| S2 | −1.7658E−01 | 8.8998E−02 | 5.4471E−01 | −1.7234E+00 | 2.4692E+00 | −1.8344E+00 | 5.4577E−01 |
| S3 | −2.2106E−01 | 7.8530E−02 | 8.7271E−01 | −2.4492E+00 | 3.3478E+00 | −2.4291E+00 | 7.3075E−01 |
| S4 | −8.2506E−02 | 2.1468E−02 | 4.4448E−01 | −9.2995E−01 | 9.8170E−01 | −5.1555E−01 | 1.5461E−01 |
| S5 | −7.9513E−02 | 4.5783E−02 | −4.7211E−01 | 1.3866E+00 | −2.0633E+00 | 1.4219E+00 | −2.8548E−01 |
| S6 | −4.0050E−02 | −1.4978E−01 | 3.7228E−01 | −8.3699E−01 | 1.0847E+00 | −7.6455E−01 | 2.3593E−01 |
| S8 | 3.0136E−02 | −9.5960E−02 | 5.7084E−02 | 5.2205E−02 | −5.8277E−02 | 1.9140E−02 | −2.1934E−03 |
| S9 | 2.3007E−01 | −3.3411E−01 | 2.4178E−01 | −1.2801E−01 | 4.4164E−02 | −9.4484E−03 | 9.8646E−04 |
| S10 | 1.0971E−01 | −5.8114E−02 | −2.7684E−02 | 3.3169E−02 | −1.3595E−02 | 2.6489E−03 | −2.0108E−04 |
| S11 | −2.7035E−01 | 1.0341E−01 | −2.0924E−02 | 2.6013E−03 | −2.1129E−04 | 1.1378E−05 | −3.2689E−07 |
| S12 | −2.4615E−01 | 1.2082E−01 | −4.8540E−02 | 1.2698E−02 | −1.9484E−03 | 1.5784E−04 | −5.1768E−06 |

TABLE 14

High order aspheric coefficients A4, A6, A8, A10, A12, A14, A16 of the aspheric lens are shown in the following table.

| Surface No. | A4 | A6 | A8 | A10 | A12 | A14 | A16 |
|---|---|---|---|---|---|---|---|
| S1 | 2.5918E−02 | 5.5567E−02 | −1.8517E−01 | 3.9750E−01 | −4.9676E−01 | 3.2878E−01 | −9.5524E−02 |
| S2 | −2.1398E−01 | 3.5598E−01 | −2.5683E−01 | −1.5899E−01 | 4.4196E−01 | −3.3449E−01 | 8.7010E−02 |
| S3 | −3.1693E−01 | 5.2560E−01 | −3.9607E−01 | 1.2353E−01 | −8.3233E−02 | 1.6509E−01 | −8.4579E−02 |
| S4 | −1.5931E−01 | 2.5873E−01 | −6.3547E−02 | −1.2987E−01 | 5.7393E−02 | 1.5269E−01 | −7.9540E−02 |
| S5 | −8.1614E−02 | 5.0339E−02 | −3.1834E−01 | 6.0835E−01 | −5.4596E−01 | 4.2817E−02 | 1.6626E−01 |
| S6 | −8.1042E−02 | 1.1272E−01 | −3.4788E−01 | 3.2556E−01 | −7.0829E−02 | −9.6216E−02 | 6.0695E−02 |
| S7 | −1.2430E−01 | 4.4538E−01 | −9.5244E−01 | 1.1858E+00 | −8.0801E−01 | 2.8840E−01 | −4.4186E−02 |
| S8 | −3.6851E−02 | 1.4466E−01 | −4.2320E−01 | 5.7609E−01 | −3.5807E−01 | 1.0422E−01 | −1.1640E−02 |
| S9 | 2.5678E−01 | −3.9213E−01 | 3.1649E−01 | −2.1166E−01 | 9.8954E−02 | −2.7613E−02 | 3.3715E−03 |
| S10 | 1.4291E−01 | −6.7793E−02 | −4.4270E−02 | 4.7483E−02 | −1.8132E−02 | 3.2750E−03 | −2.3144E−04 |
| S11 | −2.6971E−01 | 9.8649E−02 | −1.9975E−02 | 2.7735E−03 | −2.8737E−04 | 2.0204E−05 | −6.7592E−07 |
| S12 | −2.5556E−01 | 1.2203E−01 | −4.6321E−02 | 1.1261E−02 | −1.5963E−03 | 1.1974E−04 | −3.6602E−06 |

TABLE 15

| f1 (mm) | 4.05 | f (mm) | 3.96 |
|---|---|---|---|
| f2 (mm) | −13.56 | Fno | 1.96 |
| f3 (mm) | 10.76 | TTL (mm) | 4.73 |
| f4 (mm) | −35.17 | | |
| f5 (mm) | 22.01 | | |
| f6 (mm) | −8.10 | | |

Embodiment 6

Figure 26:
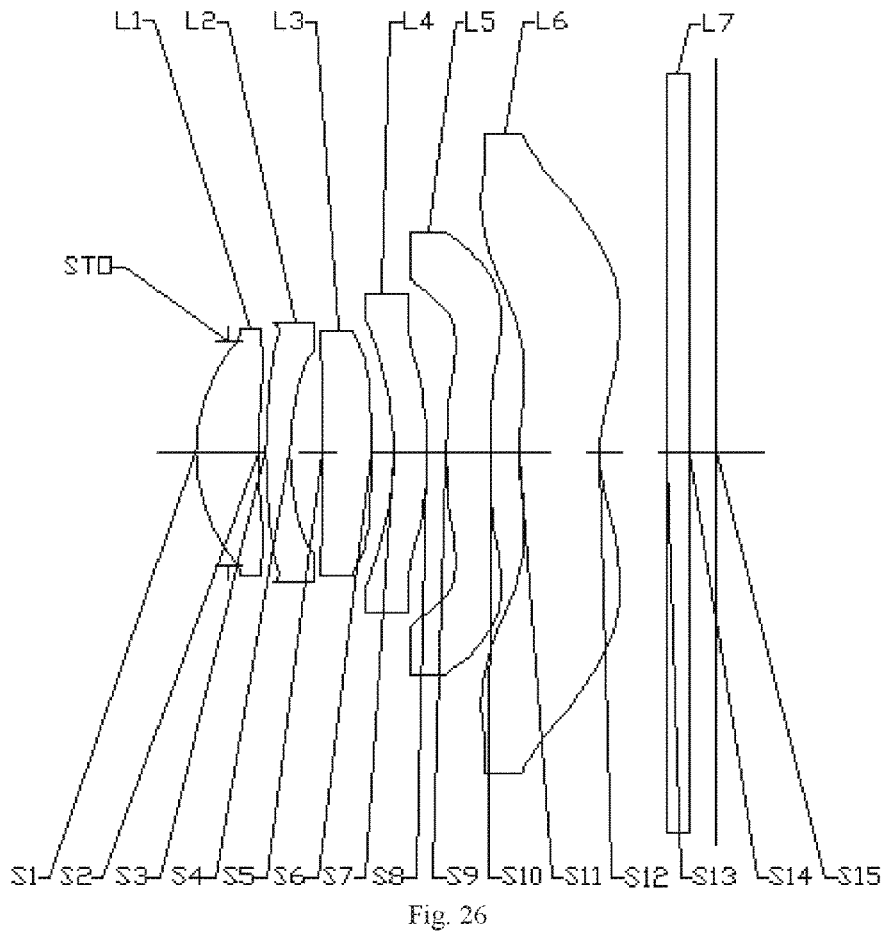
FIG. 26 is a schematic view showing a camera lens assembly according to Embodiment 6 of the present disclosure.
Figure 27:
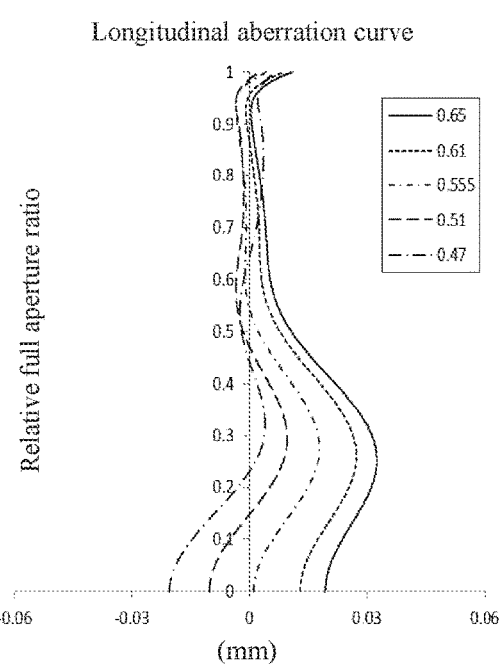
FIG. 27 is a diagram showing a longitudinal aberration curve (mm) of the camera lens assembly in Embodiment 6.
Figure 28:
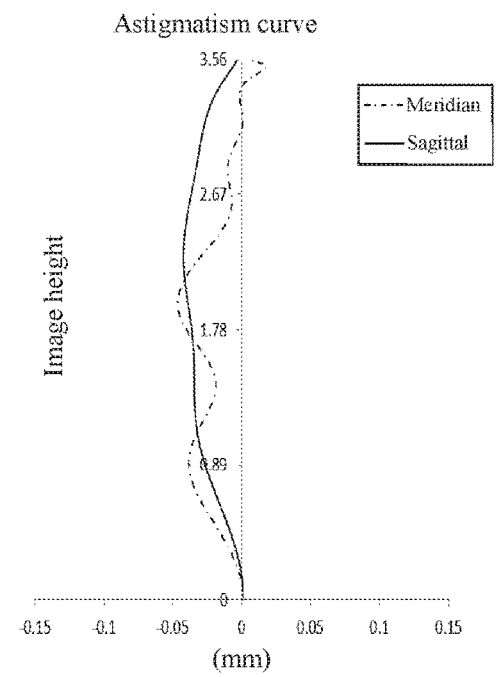
FIG. 28 is a diagram showing an astigmatism curve (mm) of the camera lens assembly in Embodiment 6.
Figure 29:
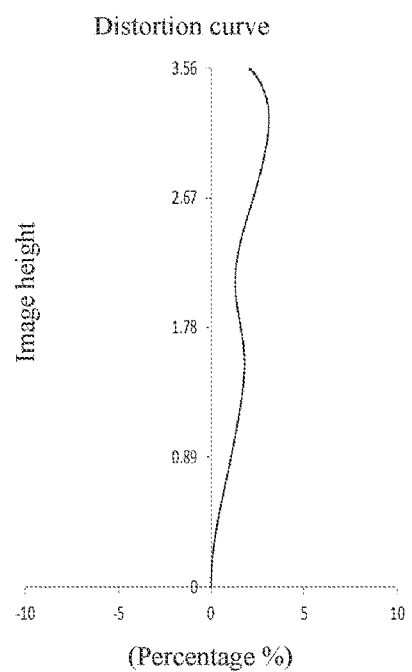
FIG. 29 is a diagram showing a distortion curve (%) of the camera lens assembly in Embodiment 6.
Figure 30:
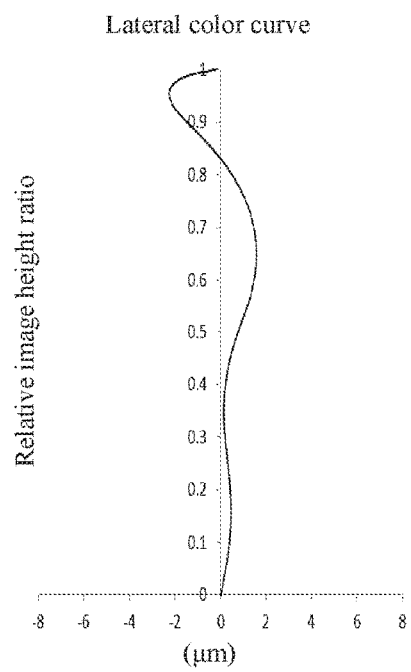
FIG. 30 is a diagram showing a lateral color curve (μm) of the camera lens assembly in Embodiment 6.

With reference to FIG. 26 to FIG. 30, in embodiment 6, the camera lens assembly meets conditions in following tables 16, 17 and 18.

TABLE 16

| Surface No. | Surface type | Curvature radius | Thickness | Refractive index/abbe number | Conic coefficient |
|---|---|---|---|---|---|
| OBJ | spherical | infinity | infinity | — | — |
| STO | spherical | infinity | −0.2920 | — | — |
| S1 | aspheric | 1.5345 | 0.5716 | 1.544/56.11 | −1.0362 |
| S2 | aspheric | 4.4655 | 0.0601 | — | −6.0966 |
| S3 | aspheric | 3.1223 | 0.2250 | 1.651/21.52 | −0.4078 |
| S4 | aspheric | 2.2442 | 0.2865 | — | 0.6635 |
| S5 | aspheric | 7.7578 | 0.4492 | 1.535/55.80 | −0.7829 |
| S6 | aspheric | −25.1018 | 0.2061 | — | −1.0001 |
| S7 | aspheric | −3.1544 | 0.3031 | 1.651/21.52 | −0.1029 |
| S8 | aspheric | −3.6262 | 0.1739 | — | −1.6741 |
| S9 | aspheric | 16.2360 | 0.3966 | 1.535/55.80 | 14.5392 |
| S10 | aspheric | −589.4029 | 0.2676 | — | 0.2986 |
| S11 | aspheric | 2.7403 | 0.7343 | 1.535/55.80 | −0.8399 |
| S12 | aspheric | 1.5074 | 0.6101 | — | −1.0287 |
| S13 | spherical | infinity | 0.2100 | 1.517/64.17 | — |
| S14 | spherical | infinity | 0.2358 | — | — |
| S15 | spherical | infinity | — | — | — |

TABLE 17

High order aspheric coefficients A4, A6, A8, A10, A12, A14, A16 of the aspheric lens are shown in the following table.

| Surface No. | A4 | A6 | A8 | A10 | A12 | A14 | A16 |
|---|---|---|---|---|---|---|---|
| S1 | 1.3915E−02 | 1.3383E−01 | −3.8897E−01 | 6.8212E−01 | −7.0760E−01 | 3.9851E−01 | −1.0309E−01 |
| S2 | −1.9368E−01 | 2.5283E−01 | −9.9102E−02 | −1.7073E−01 | 1.7783E−01 | −4.0815E−02 | −1.1598E−02 |
| S3 | −2.9241E−01 | 3.8791E−01 | −1.1428E−01 | −1.3137E−01 | −7.8998E−02 | 3.2450E−01 | −1.5942E−01 |
| S4 | −1.5645E−01 | 3.5194E−01 | −7.1917E−01 | 1.8098E+00 | −2.9149E+00 | 2.4652E+00 | −7.9145E−01 |
| S5 | −6.5854E−02 | 4.2746E−02 | −3.8462E−01 | 8.2152E−01 | −8.5687E−01 | 2.2821E−01 | 1.3639E−01 |
| S6 | −9.0361E−02 | 1.4472E−01 | −2.8631E−01 | −2.6418E−02 | 4.4324E−01 | −4.3282E−01 | 1.4604E−01 |
| S7 | −1.3211E−01 | 3.5833E−01 | −5.7432E−01 | 5.0424E−01 | −1.7823E−01 | −5.9054E−03 | 1.1077E−02 |
| S8 | −2.9373E−02 | 6.8637E−02 | −2.9099E−01 | 4.8098E−01 | −3.2661E−01 | 1.0020E−01 | −1.1627E−02 |
| S9 | 3.5947E−01 | −6.6114E−01 | 6.7463E−01 | −5.1738E−01 | 2.6227E−01 | −7.6600E−02 | 9.5550E−03 |
| S10 | 2.5653E−01 | −2.5760E−01 | 1.1182E−01 | −2.6212E−02 | 2.5112E−03 | 9.0864E−05 | −2.4110E−05 |
| S11 | −2.2127E−01 | 5.7204E−02 | −1.1003E−03 | −2.1129E−03 | 4.3341E−04 | −3.6334E−05 | 1.1576E−06 |
| S12 | −2.3461E−01 | 1.0952E−01 | −4.2758E−02 | 1.0677E−02 | −1.5378E−03 | 1.1640E−04 | −3.5790E−06 |

TABLE 18

| f1 (mm) | 4.01 | f (mm) | 3.98 |
|---|---|---|---|
| f2 (mm) | −13.53 | Fno | 1.96 |
| f3 (mm) | 11.09 | TTL (mm) | 4.73 |
| f4 (mm) | −49.56 | | |
| f5 (mm) | 29.44 | | |
| f6 (mm) | −7.88 | | |

Embodiment 7

Figure 34:
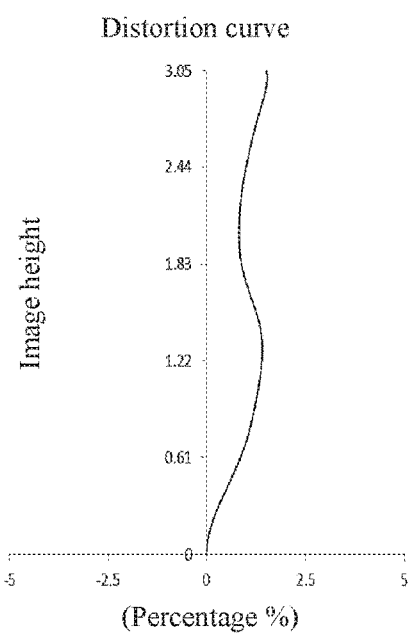
FIG. 34 is a diagram showing a distortion curve (%) of the camera lens assembly in Embodiment 7.
Figure 35:
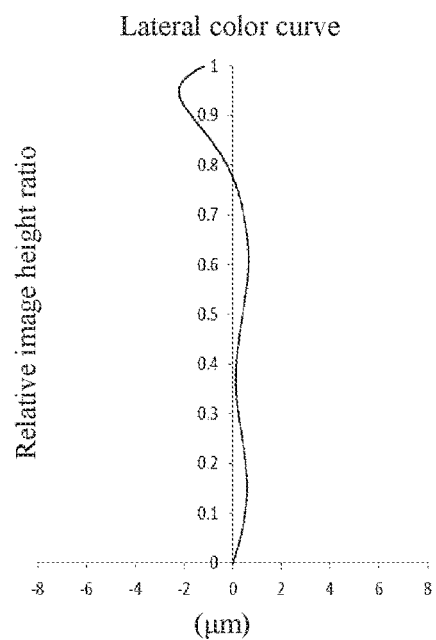
FIG. 35 is a diagram showing a lateral color curve (μm) of the camera lens assembly in Embodiment 7.

With reference to FIG. 31 to FIG. 35, in embodiment 7, the camera lens assembly meets conditions in following tables 19, 20 and 21.

TABLE 19

| Surface No. | Surface type | Curvature radius | Thickness | Refractive index/abbe number | Conic coefficient |
|---|---|---|---|---|---|
| OBJ | spherical | infinity | infinity | — | — |
| STO | spherical | infinity | −0.2920 | — | — |
| S1 | aspheric | 1.3008 | 0.5115 | 1.544/56.11 | −0.8497 |
| S2 | aspheric | 4.2779 | 0.0614 | — | 0.2212 |
| S3 | aspheric | 3.1289 | 0.2106 | 1.651/21.52 | −0.2540 |
| S4 | aspheric | 2.0459 | 0.2473 | — | 0.3846 |
| S5 | aspheric | 12.0160 | 0.3841 | 1.535/55.80 | −0.9990 |
| S6 | aspheric | −8.8996 | 0.2964 | — | −1.0001 |
| S7 | spherical | −1.5708 | 0.3000 | 1.651/21.52 | — |
| S8 | aspheric | −1.6561 | 0.1000 | — | −1.6306 |
| S9 | aspheric | 4774.7425 | 0.4345 | 1.535/55.80 | 14.5392 |
| S10 | aspheric | −14891.8185 | 0.2200 | — | 0.2986 |
| S11 | aspheric | 2.2453 | 0.4965 | 1.535/55.80 | −0.8682 |
| S12 | aspheric | 1.2668 | 0.6112 | — | −0.9979 |
| S13 | spherical | infinity | 0.2100 | 1.517/64.17 | — |
| S14 | spherical | infinity | 0.1965 | — | — |
| S15 | spherical | infinity | — | — | — |

TABLE 20

High order aspheric coefficients A4, A6, A8, A10, A12, A14, A16 of the aspheric lens are shown in the following table.

| Surface No. | A4 | A6 | A8 | A10 | A12 | A14 | A16 |
|---|---|---|---|---|---|---|---|
| S1 | 4.1255E−02 | 8.8470E−02 | −2.8935E−01 | 8.3695E−01 | −1.4904E+00 | 1.4751E+00 | −6.5614E−01 |
| S2 | −3.1836E−01 | 5.1200E−01 | 2.7845E−01 | −2.4961E+00 | 4.0108E+00 | −2.9400E+00 | 8.0735E−01 |
| S3 | −5.9152E−01 | 1.7577E+00 | −3.8013E+00 | 7.6903E+00 | −1.2148E+01 | 1.1352E+01 | −4.4037E+00 |
| S4 | −3.0482E−01 | 8.5949E−01 | −1.2224E+00 | 1.8855E+00 | −2.5181E+00 | 1.3345E+00 | 9.0323E−01 |
| S5 | −5.6267E−02 | −1.3513E+00 | 8.1055E+00 | −2.8401E+01 | 5.7119E+01 | −6.2677E+01 | 2.9302E+01 |
| S6 | −1.4418E−01 | 2.0827E+00 | −6.1732E+00 | −8.5214E+00 | 2.8193E+00 | −3.7607E+00 | 1.9359E+00 |
| S8 | 1.8654E−01 | −8.7541E−01 | 1.8645E+00 | −2.3176E+00 | 1.8009E+00 | −7.8806E−01 | 1.4536E−01 |
| S9 | 4.1928E−01 | −1.4501E+00 | 2.3387E+00 | −2.4168E+00 | 1.5189E+00 | −5.4706E−01 | 8.7593E−02 |
| S10 | 1.8706E−01 | −4.7817E−01 | 4.7672E−01 | −2.8461E−01 | 9.4444E−02 | −1.5058E−02 | 8.1373E−04 |
| S11 | −3.6215E−01 | 8.2758E−02 | 3.3417E−02 | −2.1451E−02 | 4.6896E−03 | −4.7587E−04 | 1.8635E−05 |
| S12 | −4.0824E−01 | 2.5380E−01 | −1.2891E−01 | 4.4692E−02 | −9.4547E−03 | 1.0821E−03 | −5.0819E−05 |

TABLE 21

| f1 (mm) | 3.23 | f (mm) | 3.66 |
|---|---|---|---|
| f2 (mm) | −9.76 | Fno | 2.06 |
| f3 (mm) | 9.59 | TTL (mm) | 4.28 |
| f4 (mm) | 117.99 | | |
| f5 (mm) | 6735.7 | | |
| f6 (mm) | −6.58 | | |

In Embodiments 1~7, respective formulas meet conditions in the following table.

| Formula | Embodiment 1 | 2 | 3 | 4 | 5 | 6 | 7 |
|---|---|---|---|---|---|---|---|
| \|f/f3\| + \|f/f6\| | 0.950 | 0.947 | 0.832 | 0.784 | 0.857 | 0.863 | 0.937 |
| TTL/ImgH | 1.427 | 1.357 | 1.317 | 1.317 | 1.322 | 1.329 | 1.403 |
| CT3/CT4 | 1.321 | 1.188 | 1.496 | 1.493 | 1.408 | 1.482 | 1.280 |
| f6/f | −1.757 | −1.523 | −1.866 | −2.091 | −2.046 | −1.981 | −1.800 |
| f/EPD | 2.09 | 2.06 | 1.96 | 1.96 | 1.96 | 1.96 | 2.06 |
| R12/R10 | −1.22E−04 | −1.32E−04 | −1.44E−05 | −1.47E−05 | −2.39E−03 | −2.56E−03 | −8.51E−05 |
| ImgH/f | 0.823 | 0.850 | 0.934 | 0.930 | 0.904 | 0.895 | 0.834 |
| CT5/CT6 | 0.900 | 0.640 | 0.522 | 0.528 | 0.538 | 0.540 | 0.875 |
| f12/f6 | −0.660 | −0.748 | −0.664 | −0.591 | −0.635 | −0.646 | −0.643 |
| DT11/DT32 | 0.947 | 0.995 | 0.926 | 0.925 | 1.007 | 1.001 | 1.049 |
| DT11/DT62 | 0.368 | 0.383 | 0.372 | 0.382 | 0.386 | 0.385 | 0.415 |

Reference throughout this specification to "an embodiment," "some embodiments," "illustrative embodiment", "an example," "a specific example," or "some examples," means that a particular feature, structure, material, or characteristic described in connection with the embodiment or example is included in at least one embodiment or example of the present disclosure. In the present specification, the illustrative statement of the terms above is not necessarily referring to the same embodiment or example. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, unless specified otherwise, "a plurality of" means two or more than two.

Although explanatory embodiments of the present disclosure have been shown and described, it would be appreciated by those ordinary skilled in the art that various changes, modifications, alternatives and variants can be made in these embodiments without departing from principles and spirits of the present disclosure, and the scope of the present disclosure is restricted by claims and their equivalents.

What is claimed is:

1. A camera lens assembly, comprising a first lens, a second lens, a third lens, a fourth lens, a fifth lens and a sixth lens from an object side of the camera lens assembly to an image side of the camera lens assembly in turn, wherein
    the first lens has a positive refractive power;
    the second lens has a negative refractive power, an object-side surface of the second lens is convex and an image-side surface of the second lens is concave;
    the third lens has a positive refractive power;
    the fourth lens has a refractive power, an object-side surface of the fourth lens is concave and an image-side surface of the fourth lens is convex;
    the fifth lens has a refractive power, an object-side surface of the fifth lens is convex and an image-side surface of the fifth lens is convex;
    the sixth lens has a negative refractive power;
    a total number of the lenses having the refractive power in the camera lens assembly is six;
    the camera lens assembly meets following formulas:

$|f/f3|+|f/f6|<1.0$; and $TTL/ImgH<1.46$, wherein f3 represents an effective focal length of the third lens, f6 represents an effective focal length of the sixth lens, f represents an effective focal length of the camera lens assembly, TTL represents an axial distance from an object-side surface of the first lens to an imaging plane, and ImgH equals to half of a diagonal of an effective pixel region in the imaging plane.

2. The camera lens assembly according to claim 1, wherein the camera lens assembly meets a following formula:

$1.0<CT3/CT4<1.6$, wherein CT3 represents a central thickness of the third lens in an optical axis, and CT4 represents a central thickness of the fourth lens in the optical axis.

3. The camera lens assembly according to claim 1, wherein the camera lens assembly meets a following formula:

$-2.1<f6/f<-1.5$.

4. The camera lens assembly according to claim 1, wherein the camera lens assembly meets a following formula:

$f/EPD<2.1$, wherein EPD represents a diameter of an entrance pupil.

5. The camera lens assembly according to claim 1, wherein an image-side surface of the sixth lens is concave, and the camera lens assembly meets a following formula:

$-0.5<R12/R10<0$, wherein R12 represents a curvature radius of the image-side surface of the sixth lens, and R10 represents a curvature radius of the image-side surface of the fifth lens.

6. The camera lens assembly according to claim 1, wherein the camera lens assembly meets a following formula:

$0.8ImgH/f<1.0$.

7. The camera lens assembly according to claim 1, wherein the camera lens assembly meets a following formula:

$0.5<CT5/CT6<1.4$, wherein CT5 represents a central thickness of the fifth lens in an optical axis, and CT6 represents a central thickness of the sixth lens in the optical axis.

8. The camera lens assembly according to claim 1, wherein the camera lens assembly meets a following formula:

$-1<f12/f6<-0.5$, wherein f12 represents a combined focal length of the first lens and the second lens.

9. The camera lens assembly according to claim 1, wherein the camera lens assembly meets a following formula:

$0.8<DT11/DT32<1.2$, wherein DT11 represents an effective radius of an object-side surface of the first lens, and DT32 represents an effective radius of an image-side surface of the third lens.

10. The camera lens assembly according to claim 1, wherein the camera lens assembly meets a following formula:

$0.35<DT11/DT62<0.5$, wherein DT11 represents an effective radius of an object-side surface of the first lens, and DT62 represents an effective radius of an image-side surface of the sixth lens.

* * * * *